United States Patent [19]

Fisher et al.

[11] Patent Number: 5,632,143
[45] Date of Patent: May 27, 1997

[54] GAS TURBINE SYSTEM AND METHOD USING TEMPERATURE CONTROL OF THE EXHAUST GAS ENTERING THE HEAT RECOVERY CYCLE BY MIXING WITH AMBIENT AIR

[75] Inventors: Uriyel Fisher, Haifa; Joseph Sinai, Ramat Gan; Yoel Gilon, Jerusalem, all of Israel

[73] Assignee: Ormat Industries Ltd., Yavne, Israel

[21] Appl. No.: 262,503

[22] Filed: Jun. 20, 1994

Related U.S. Application Data

[63] Continuation-in-part of Ser. No. 261,045, Jun. 14, 1994, abandoned.

[51] Int. Cl.⁶ .................................................. F02C 6/00
[52] U.S. Cl. .................................. 60/39.182; 60/39.181; 60/39.5
[58] Field of Search ................ 60/39.181, 39.182, 60/39.183, 39.2, 39.29, 39.5, 262, 726

[56] References Cited

U.S. PATENT DOCUMENTS

| | | | |
|---|---|---|---|
| 3,150,487 | 9/1964 | Mangan et al. | 60/39.182 |
| 3,280,551 | 10/1966 | Bracken et al. | 60/39.181 |
| 3,436,911 | 4/1969 | Squires | 60/39.181 |
| 3,436,912 | 4/1969 | Squires | 60/39.181 |
| 4,003,204 | 1/1977 | Bradley | 60/39.182 |
| 4,125,996 | 11/1978 | Schmoch et al. | 60/39.182 |
| 4,178,754 | 12/1979 | Earnest | 60/39.181 |
| 4,184,325 | 1/1980 | Mandrin | 60/39.181 |
| 4,204,401 | 5/1980 | Earnest | 60/39.181 |
| 4,207,842 | 6/1980 | Kehlhofer | 60/39.181 |
| 4,267,692 | 5/1981 | Earnest | 60/39.181 |
| 4,353,206 | 10/1982 | Lee | 60/39.182 |
| 4,578,944 | 4/1986 | Martens et al. | 60/39.182 |
| 4,638,632 | 1/1987 | Wulf et al. | 60/39.5 |
| 4,693,072 | 9/1987 | McLean et al. | 60/39.182 |
| 4,761,957 | 8/1988 | Eberhardt et al. | 60/650 |
| 4,821,507 | 4/1989 | Bachmann et al. | 60/39.182 |
| 4,875,436 | 10/1989 | Smith et al. | 60/39.182 |
| 5,412,936 | 5/1995 | Lee et al. | 60/39.182 |
| 5,493,854 | 2/1996 | Nielsen | 60/39.182 |

FOREIGN PATENT DOCUMENTS

| | | | |
|---|---|---|---|
| 0367109 | 1/1923 | Germany | 60/39.183 |
| 026710 | 12/1982 | Japan | 60/39.182 |

Primary Examiner—Louis J. Casaregola
Assistant Examiner—Ted Kim
Attorney, Agent, or Firm—Donald M. Sandler

[57] ABSTRACT

A gas turbine system with a heat recovery cycle includes a gas turbine unit that produces hot exhaust gases which are applied to a heat recovery heat exchanger containing a working fluid responsive to applied hot gases for producing vaporized working fluid and cooled gases which are vented. A turbine connected to a generator and responsive to the vaporized working fluid generates power and produces expanded working fluid. A condenser condenses the expanded vaporized working fluid to condensate which is returned to the heat recovery heat exchanger. A control device (94) controls the temperature of the applied hot gases, based on a sensed temperature (89) and include mixer apparatus (87) for mixing ambient air with the hot exhaust gases and producing a mixture of hot exhaust gases and ambient air before the mixture is applied to the heat recovery heat exchanger.

27 Claims, 3 Drawing Sheets

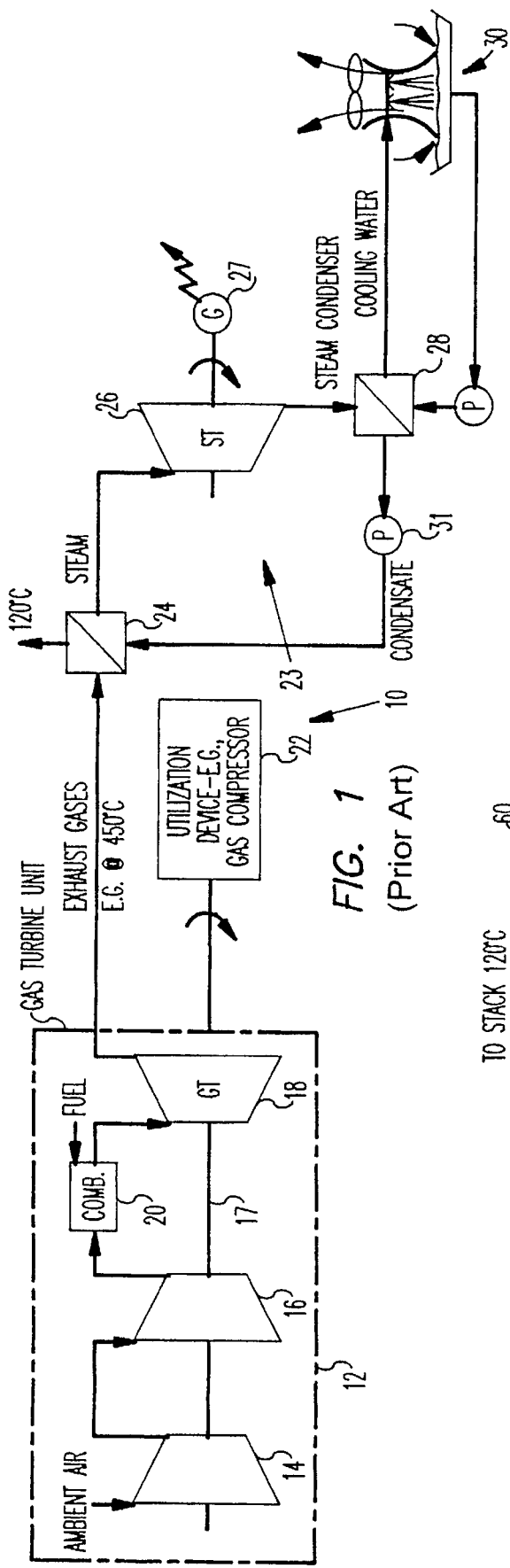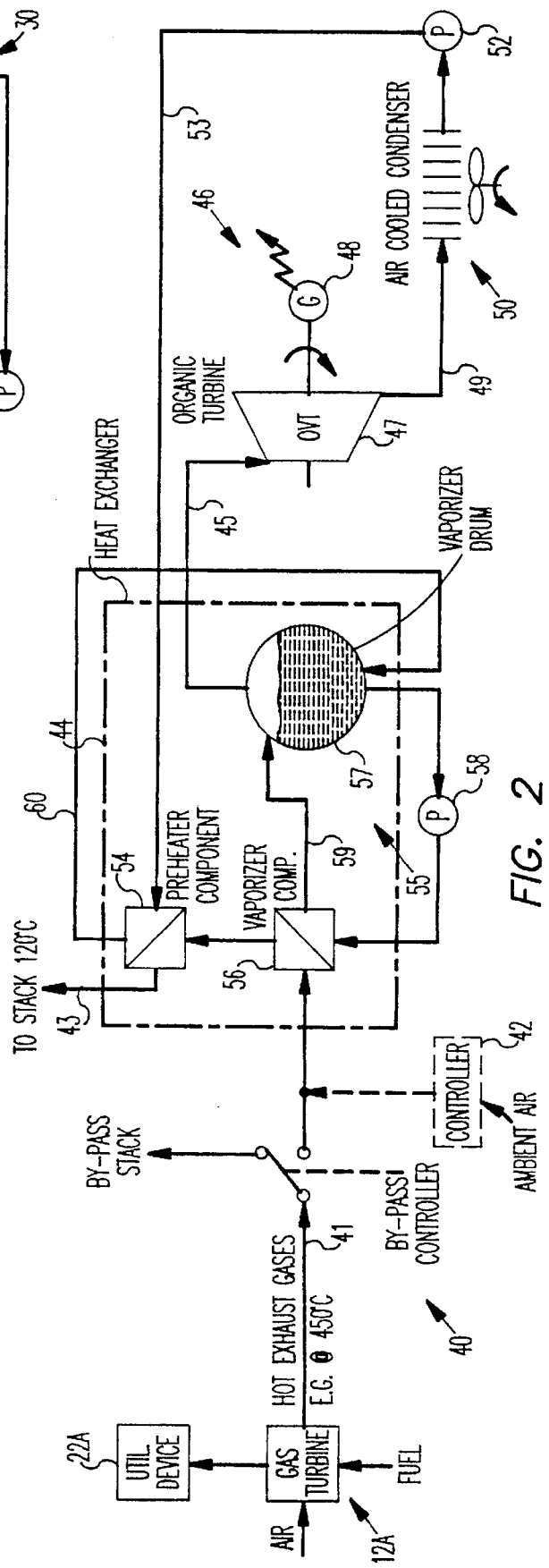

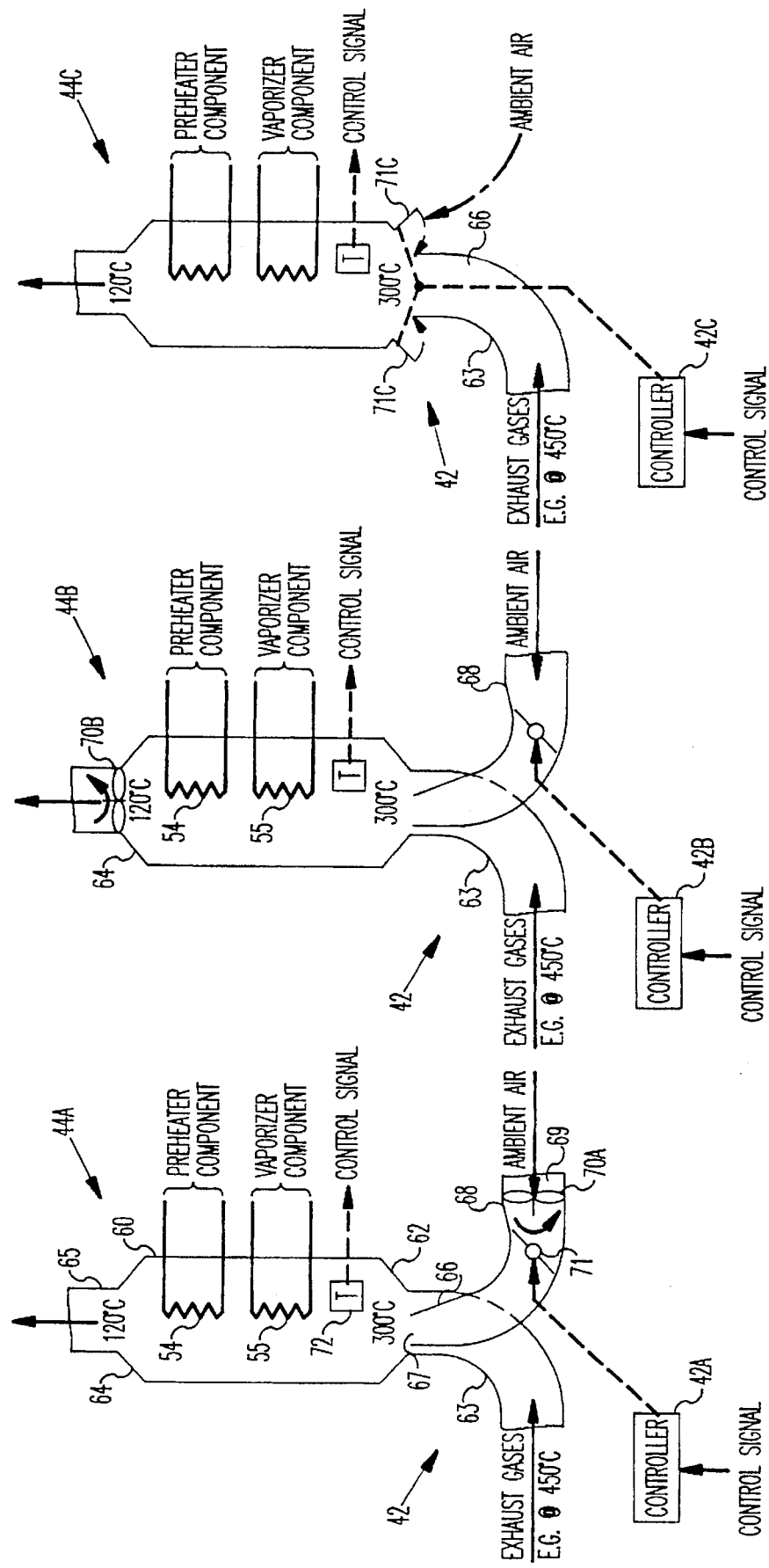

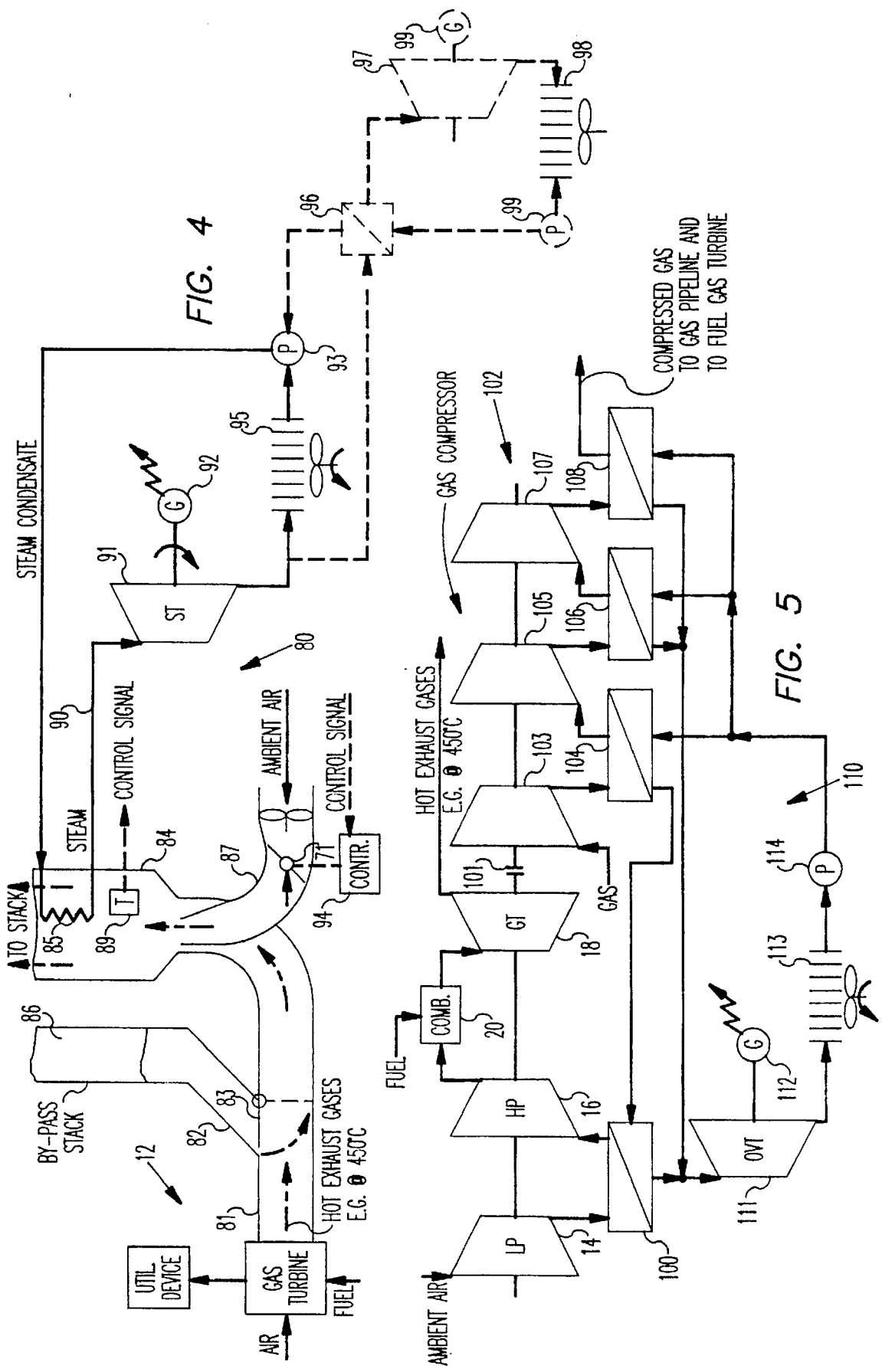

ated schematically in FIG. 1 which shows a two stage air
GAS TURBINE SYSTEM AND METHOD USING TEMPERATURE CONTROL OF THE EXHAUST GAS ENTERING THE HEAT RECOVERY CYCLE BY MIXING WITH AMBIENT AIR This application is a continuation-in-part of application Ser. No. 08/261,045 filed Jun. 14, 1994, now abandoned.

1. TECHNICAL FIELD

This invention relates to a gas turbine system that includes a heat recovery cycle, and to a method for using the same.

2. BACKGROUND OF THE INVENTION

Gas turbines have been used for producing power in many installations around the world. Often, the exhaust gases of the gas turbine are merely exhausted into the atmosphere. For example, high pressure natural gas transmission pipelines are conventionally used for transporting gas from production fields to customers remotely located from the fields. Gas compressors feeding such pipelines usually are powered by a gas turbine, and optionally, a heat recovery cycle can be employed to reduce the net power requirement by converting waste heat in the hot exhaust gases from the turbine into electricity. An installation of this type is illustrated schematically in FIG. 1 which shows a two stage air compressor producing compressed air that is supplied to a gas turbine coupled to a utilization device, such as a gas compressor. In such an installation, a portion of the compressed gas supplied by the compressor is bled into a combustor and burned in the compressed air before the resultant combustion gases are applied to the gas turbine.

The temperature of the hot gases that exit the gas turbine can be about 450° C., and these gases usually contain sufficient heat to make heat recover economically justifiable. Conventionally, the exhaust gases are applied to an indirect contact heat exchanger containing water which is vaporized. The resultant steam is supplied to a steam turbine coupled to a generator that produces electricity, and expanded steam that exits the turbine. The expanded steam is condensed in a condenser that usually is supplied with cooling water from a pond associated with a cooling tower.

During cold weather, ambient temperature may drop below freezing causing the cooling water and the steam condensate to freeze thus interfering with the functioning of the condenser and the cooling tower. When this occurs, operation of the heat recovery cycle must be terminated.

Recent improvements in organic vapor turbine design and construction have suggested that an organic vapor turbine using an air-cooled condenser might be used to replace the steam turbine in the installation described above. This would have the advantage of permitting the heat recovery cycle to remain operational during the coldest weather. However, the high temperature of the exhaust gases and the characteristics of organic fluids (e.g., pentane) used in organic vapor turbine cycles raises the possibility that a relatively hot portion of the heat exchanger could result in carbon formation and deposition due to the excess heating of the organic fluid by the hot exhaust gases.

It is therefore an object of the present invention to provide a new and improved gas turbine system with heat recovery cycle and a method for using the same which overcomes or substantially ameliorates the problem described above.

BRIEF DESCRIPTION OF THE INVENTION

The present invention provides a heat recovery cycle for a gas turbine system that includes a gas turbine unit for driving a utilization device and producing hot exhaust gases, and a heat recovery heat exchanger containing a working fluid, preferably an organic fluid, which is responsive to applied hot gases for producing vaporized working fluid and cooled gases which can be vented to the atmosphere. When an organic working fluid is used, an organic vapor turbine connected to a generator and responsive to the vaporized organic fluid generates power and produces expanded organic vapor that exits the turbine. The expanded vaporized organic fluid is condensed in a condenser, and the condensed organic fluid is returned to the heat recovery heat heat exchanger by a pump. When ambient temperatures are below the freezing temperature of water, an air cooled organic vapor condenser is used. The temperature of the hot gases applied to the heat recovery heat exchanger is controlled by a controller which includes a mixer for mixing ambient air with the hot exhaust gases for producing a mixture of hot exhaust gases and ambient air before the mixture is applied to the heat recovery heat exchanger and enters into heat exchange relationship with said organic fluid. Thus, the temperature of the exhaust gases applied to the heat exchanger may be reduced from, for example, around 450° C. to around 300° C.

To control the amount of ambient air mixed with the hot exhaust gases, the controller may include a selectively positionable valve, such as a flap valve, for controlling the amount of ambient air that is mixed with the hot exhaust gases. In such case, the controller may include a temperature sensor for sensing the temperature of the applied hot gases, and a valve controller responsive to the temperature sensed by said temperature sensor for controlling the position of the valve, and thus the amount of ambient air mixed with the hot exhaust gases.

BRIEF DESCRIPTION OF THE DRAWINGS

Embodiments of the present invention are described by way of example with reference to the accompanying drawings wherein:

FIG. 1 is a schematic block diagram of a conventional gas turbine system into which a steam-based heat recovery cycle is integrated;

FIG. 2 is a schematic block diagram of a gas turbine system with an organic fluid heat recovery cycle according to the present invention;

FIGS. 3A, 3B, and 3C are schematic elevation sectional diagrams showing details of three configurations of a heat exchanger according to the present invention;

FIG. 4 is a schematic block diagram of a gas turbine system with a steam-based heat recovery cycle into which the present invention is incorporated; and FIG. 5 is a schematic block diagram of a gas compressor operated by a gas turbine for the purpose of showing an example of the utilization of the heat in the intercoolers of the compressors of the gas turbine and of the gas compressors for generating power in accordance with the present invention.

DETAILED DESCRIPTION

Referring now to the drawings, reference numeral 10 designates a gas turbine system according to the prior art into which is incorporated a steam-based heat recovery cycle. System 10 includes conventional gas turbine unit 12 comprising low and a high pressure compressors 14, 16 coupled by shaft 17 to gas turbine 18. Ambient air is applied to low pressure compressor 14, compressed, and applied to high pressure compressor 16.

The compressed air is applied to combustor 20 wherein fuel is burned producing high temperature gases that are applied to turbine 18 wherein expansion takes place. Energy extracted from the high temperature gases by their expansion in the turbine drives utilization device 22 which may be a gas compressor associated with a gas pipeline (not shown). The expanded gases that exit from the exhaust of turbine 18 have a temperature, which can be around 450° C., for example, or higher or lower, depending on the characteristics of the gas turbine. Heat is extracted from the hot exhaust gases in heat recovery cycle apparatus 23 which includes indirect heat recovery heat exchanger 24 to which the hot exhaust gases are applied.

Heat exchanger 24 contains water which is vaporized by the heat contained in the hot exhaust gases which are cooled to around 120° C. by the heat exchange process that takes place between the hot exhaust gases and the water in heat exchanger 24. The cooled exhaust gases are vented to the atmosphere, as the steam produced by heat recovery heat exchanger 24 is applied to steam turbine 26 coupled to generator 27. The steam expands in turbine 26 driving the generator and producing expanded steam that exhausts into indirect steam condenser 28 cooled by water supplied from cooling tower 30. Pump 31 returns condensate produced by condenser 28 to heat exchanger 24.

When low ambient temperatures causes freezing of the water associated with cooling tower 30, and of steam condensate produced by steam condenser 28, apparatus 23 will be unable to operate; and the heat recovery cycle must be shut down. This situation can be averted by utilizing an organic fluid heat recovery system having an air-cooled condenser because common organic working fluids, such as hydrocarbon-based fluids, for example pentane, have a very low freezing point and can be used under winter conditions found in most places in the world. Such organic fluids may form carbon deposits at relatively high temperatures with the result that the heat exchanger design must take into account the possibility of carbon formation or production from the working fluid particularly when the heat exchange fluid has a temperature of around 450° C. or greater.

Apparatus 40 shown in FIG. 2 takes into account the possibility of carbon production from the organic fluid, but in a way that imposes less stringent demands on the design of the heat exchanger. Specifically, apparatus 40 incorporates control means 42 for controlling the temperature of the hot gases that are applied to heat exchanger 44 such that the temperature of the gases that enter into heat exchange relationship with the organic fluid is reduced. Specifically, the temperature of the exhaust gases is reduced by mixing ambient air with the hot exhaust gases before the mixture enters into heat exchange relationship with the organic fluid. For example, the reduced temperature may be about 300° C.

Apparatus 40 includes gas turbine unit 12A similar to unit 12 shown in FIG. 1 for driving utilization device 22A, which may be a gas compressor, and producing hot exhaust gases in line 41. Heat recovery heat exchanger 44 containing an organic fluid, e.g., pentane, in the form of n-pentane or iso-pentane, is responsive to the applied hot exhaust gases for producing vaporized organic fluid in output line 45, and cooled exhaust gases in line 43 which are vented to the atmosphere through a suitable stack. Organic vapor turbogenerator 46, which includes organic vapor turbine 47 coupled to electric generator 48, is responsive to vaporized organic fluid in line 45 for generating power and producing expanded organic vapor in line 49 connected to the exhaust of turbine 47. Condenser 50, which is air-cooled, serves to condense the expanded vaporized organic fluid that exits turbine 47, and pump 52 returns the organic fluid condensate to heat recovery heat exchanger 44 via line 53.

Because of the relatively high temperature of the exhaust gases that enter into heat exchange relation with the organic fluid in the heat exchanger, the preferred construction of heat recovery heat exchanger 44 includes preheater component 54, and vaporizer component 55 which has vaporizer heat exchange portion 56 for receiving the hot exhaust gases, and vaporizer drum 57. Portion 56 contains organic fluid in its liquid phase allowing an orderly transfer of heat to the organic fluid without pockets of vapor forming, thus promoting the efficient transfer of heat to the organic fluid. After the heated liquid is transferred by the operation of pump 58 from portion 56 to drum 57 via line 59, the heated liquid vaporizes in the drum, and the vaporized organic fluid flows via line 45 to turbine 47.

After giving up heat to the liquid organic fluid in portion 56, the gases, somewhat reduced in temperature, encounter obtained preheater component 54 containing organic fluid condensate from condenser 50 via line 53 by reason of the operation of pump 52. Additional heat is extracted from the gases in preheater component 54 preheating the organic fluid condensate which flows via line 60 to drum 57 which supplies preheated liquid to portion 56 of the vaporizer. The gases are cooled by this encounter to about 120° C. and are vented to the atmosphere.

While the use of an organic working cycle is particularly advantageous under the conditions where ambient temperatures are below the freezing point of water, a heat recovery cycle based on an organic working fluid of the type previously mentioned also can be advantageous even at ambient temperatures higher than the freezing point of water. In such conditions, condenser 50 can be air or water cooled and the organic fluid turbine will be much smaller due to the larger difference in specific volume between steam and organic vapor at the same temperature. In addition, among other things, the condensing pressure usually will be above atmospheric pressure.

The operation of control means 42 is illustrated in FIGS. 3A–C in connection with three embodiments of heat recovery heat exchanger 44. Heat recovery heat exchanger 44A in FIG. 3A includes tubular body 60 having inlet section 62 connected to exhaust duct 63 of the gas turbine and into which hot exhaust gases enter. Preferably, the heat recovery heat exchanger also includes outlet section 64 by which body 60 is connected to stack 65 through which the exhaust gases, after being cooled by giving up heat to vaporizer component 55 and to preheater component 54, are vented to the atmosphere.

Control means 42 associated with heat exchanger 44A also includes injector 66 having an output end 67 that opens into inlet section 62, section 68 having input end 69 open to ambient air, and fan 70A for drawing ambient air through injector 66 and into the heat recovery heat exchanger. The control means also includes a selectively positionable valve 71, e.g., a flapper valve, located in section 68.

Preferably, the control means also includes temperature sensor 72 located in the region where the hot exhaust gases from the turbine exhaust mix with ambient air exiting the injector for sensing the temperature of the gases entering heat recovery heat exchanger 44. In this manner, the temperature of the gases is sensed before they are applied to the components 55 and 54 of the heat exchanger, i.e., before heat in the gases is transferred to the organic fluid in the vaporizer and preheater components of the heat exchanger.

Temperature sensor 72 produces a control signal related to the temperature difference between the temperature of the gases entering heat recovery heat exchanger 44A and the set temperature for these gases before any heat transfer takes place; and this control signal is applied to valve controller 42A which controls the position of valve 71. In this manner, the volume of ambient air injected into the hot exhaust gases, and thus the temperature of the mixture of air and exhaust gases can be controlled in accordance with a desired set-point temperature. For example, if the temperature of the exhaust gases that exit the gas turbine is about 450° C., the temperature of the mixture could be selected as about 300° C.; and valve controller 42A would be effective to position valve 71 such that the selected temperature would be achieved. In such case, the likely temperature of the mixture of air and exhaust gases after the mixture ends its heat exchange relationship with the preheater component of the heat recovery heat exchanger, will be about 120° C.

Heat recovery heat exchanger 44B shown in FIG. 3B is similar to heat recovery heat exchanger 44A except that the fan, by which forced air is injected into the exhaust gases before they enter into heat exchange relationship with the organic fluid, is located downstream of the injector rather than upstream as in the case of heat recovery heat exchanger 44A. That is to say, fan 70B is located in the vicinity of outlet section 64 of the heat exchanger rather than in section 68. Otherwise, the operation of heat recovery heat exchanger 44B is the same as the operation of heat recovery heat exchanger 44A.

The purpose of installations shown in FIGS. 3A and 3B is to reduce the backpressure on the gas turbine exhaust with the aid of fan 70A shown in FIG. 3A and fan 70B shown in FIG. 3B. Thus, each of heat recovery heat exchangers 44A and 44B involve forced air injection. Heat recovery heat exchanger 44C differs from each of heat recovery heat exchangers 44A and 44B by reason of the absence of forced air injection, i.e., by the absence of a fan in heat recovery heat exchanger 44C. In heat recovery heat exchanger 44C, the design of the exhaust gas duct must be such that the gas turbine exhaust duct acts as an ejector. That is to say, the velocity flow of the exhaust gases in the vicinity of inlet section 62 of heat exchanger 44C must be large enough to produce a suction strong enough to draw into the heat recovery heat exchanger sufficient ambient air to achieve the desired cooling of the exhaust gases. Conventional design parameters would be employed, and no excessive experimentation would be required to achieve these results.

Control of the amount of ambient air drawn into heat recovery heat exchanger 44C can be achieved by flap valve arrangement 71C positioned at the entrance to inlet section 62 of heat recovery heat exchanger 44C.

While the above detailed description refers to the use of an organic working fluid, particularly those based on hydrocarbons, the invention is also applicable to working fluids that are not organic. For example, the invention is applicable to a water-based system where the problem is to maintain a substantially fixed vaporizing temperature for the heat recovery cycle in the face of variable ambient condition, and where ambient temperatures do not reach a temperature at which water freezes. Embodiment 80 of the present invention shown in FIG. 4 is an example of a gas turbine system with a water-based heat recovery cycle.

In embodiment 80, gas turbine system 12 produces hot exhaust gases that pass through duct 81 to connection 82 that is connected to the duct, the connection including pivotal flap-valve 83 that can be selectively pivoted from a inoperative position shown in solid lines in FIG. 4 to an operative position shown by the broken lines. In its inoperative position, valve 83 permits the hot exhaust gases to enter heat recovery heat exchanger means including vaporizer component 85, for example, in the form of water tubes; and in its operative position, valve 83 switches the hot gases to by-pass stack 86. Normally, valve 83 would be in its inoperative position; but the valve can be moved to its operative position whenever maintenance must be performed on the heat recovery cycle equipment or for other reasons.

Associated with heat recovery heat exchanger 84 is injector 87 that operates in the same manner as injector 66. In this case, however, the angular position of valve 71, and hence the amount of ambient air mixed with the hot exhaust gases as determined by a control signal generated by a temperature sensor as described below. Alternatively, an arrangement similar to that shown in FIG. 3C can be used.

The heat recovery heat exchanger means includes component 85 that contains water which is vaporized by the mixture of hot exhaust gases from the gas turbine unit and ambient air; and the steam produced is supplied by line 90 to steam turbine 91. Cooled gases downstream of the vaporizer component are vented to the atmosphere through a suitable stack. The expansion of the steam produced by steam turbine 91 drives generator 92 producing power; and expanded steam exits the turbine and enters condenser 95, preferably air cooled, for condensing the expanded steam into condensate. Pump 93 returns the steam condensate to heat recovery heat exchanger 84.

Temperature level sensor 89 associated with heat recovery heat exchanger 84 produces a control signal functionally related to the temperature difference of the gases entering heat exchanger 84 and the preferred set temperature of these gases; and this control signal is applied to control means 94 for controlling the position of valve 95 thus establishing the temperature of the mixture of exhaust gases and ambient air before the mixture enters into heat exchange relationship with the heat recovery heat exchanger means including the vaporizer component of the heat recovery heat exchanger. In this manner, the temperature of the gas mixture can be controlled to maintain a predetermined temperature for vaporizing the water in the face of variable conditions that affect the operation of heat recovery heat exchanger means 85 which includes the vaporizer component.

In an alternative arrangement, condenser 95 may be replaced with a bottoming, closed Rankine cycle organic fluid power plant as shown in broken lines in FIG. 4. In such case, steam exhausted from turbine 91 would be applied to indirect contact heat exchanger 96 containing an organic fluid which would be vaporized as a result. The vaporized organic fluid is supplied to organic vapor turbine 97 coupled to a generator; and the expanded organic vapor exiting turbine 97 is condensed in air-cooled condenser 98, the organic fluid condensate being returned to steam condenser 96 by pump 99 to complete the organic working fluid cycle. This arrangement is particularly useful when steam condenser operation is to take place at other than vacuum conditions.

The gas turbine unit constituted in accordance with the present invention may be configured as shown in FIG. 5 by reference numeral 12A with intercooler 100 located between low pressure compressor 14 and high pressure compressor 16. Gas turbine 18, which is supplied with combustion gases produced after fuel is burned in the presence of compressed air produced by compressor 16, is coupled at 101 to gas compressor 102 that receives gas from a production well (not shown) or from a gas transmission pipeline, and compresses the gas for delivery to a gas transmission line for further transport. Three stages of gas compression are shown, and these are representative of a typical gas pumping station at the origin of a transmission pipeline, or intermediate the pipeline between the well head and the terminus of the pipeline.

Gas to be compressed is supplied to low pressure compressor 103, and the heated compressed gas is cooled in intercooler 104 before being delivered to and compressed further in intermediate compressor 105. The heated compressed gas is cooled in intercooler 106 before being delivered to and compressed further in high pressure compressor 107. The heated compressed gas is cooled in cooler 108 before being delivered to the gas transmission pipeline (not shown). As indicated, some of the compressed gas is fed back to the gas turbine unit and used to fuel the gas turbine combustor.

The heat extracted from the compressed gas in intercoolers 104, 106, and 108 as well as the heat extracted from the compressed air in intercooler 100, is converted into electricity by organic converter 110. That is to say, in the configuration shown in FIG. 5, which is presented as an example of the utilization of heat extracted by the intercoolers, organic fluid preheated in intercooler 104, which is the low pressure intercooler for the gas compressor, is vaporized in intercooler 100. Intercoolers 106 and 108 associated with the intermediate and high pressure compressors of the gas compressor, also operate as vaporizers, and the outputs of these vaporizers are supplied in parallel with the output of intercooler 100 to organic vapor turbine 111 coupled to generator 112. After expansion of the vaporized organic fluid and the consequent generation of power, the expanded organic vapor is supplied to air condenser 111 wherein condensation takes place. Pump 112 returns the organic condensate in parallel to intercoolers 104, 106, and 108 to complete the organic fluid cycle.

The above description of the present invention refers to the use of an organic based, rather than a water based, working fluid for a heat recovery cycle associated with a gas turbine, when ambient temperatures are lower than the freezing point of water. The present invention, however, is also particularly advantageous in circumstances when the use of water, or its availability, is problematic.

In addition, while the above description refers to using the heat recovery cycle for producing electricity, the shaft power produced by the turbine in the heat recovery cycle can alternatively be used for directly driving equipment, such as gas compressors or running such machinery, without converting the shaft power into electricity.

Furthermore, an intermediate heat transfer fluid cycle can be used in the heat recovery cycle for transferring the heat from the exhaust gases of the gas turbine to an organic working fluid.

While the above description discloses a single organic working fluid heat recovery cycle, the present invention includes the use of cascaded, or parallel, operating units in a heat recovery cycle. If cascaded units are used, the higher pressure turbine or turbines may use water as a working fluid in closed cycles.

Moreover, while the above description discloses the use of adding air to the exhaust gases of the gas turbine for controlling the temperature of the gases from which heat is extracted in the heat recovery cycle, if preferred, a power plant utilizing a simple closed cycle organic Rankine cycle or cycles having an air cooled condenser can be used wherein no air is mixed with the exhaust gases of the gas turbine. By using such a closed, organic Rankine cycle power plant for the heat recovery rather than a steam turbine, the construction, operation, and maintenance of the overall system is simplified permitting reliable and unattended systems to operate for long periods of time at remote locations.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method for using a gas turbine system that drives a utilization device and produces hot exhaust gases;
    a) mixing ambient air with said hot exhaust gases for producing hot gases having a reduced temperature, and transferring heat from the hot gases having a reduced temperature to a working fluid contained in a heat recovery heat exchanger for producing vaporized working fluid and cooled exhaust gases that vent to the atmosphere;
    b) expanding said vaporized working fluid in a vapor turbine included in a turbogenerator for generating power and from which expanded vaporized working fluid exits; and
    c) condensing said expanded vaporized working fluid and pumping the condensate back to said heat recovery heat exchanger.

2. A method according to claim 1 including selectively switching said hot exhaust gases between said heat exchanger and a by-pass stack.

3. A method according to claim 1 including controlling the amount of ambient air that is mixed with the exhaust gases.

4. A method according to claim 3 including sensing the temperature of said hot gases having a reduced temperature before heat therein is transferred to said working fluid, and controlling the amount of said ambient air that is mixed with the hot exhaust gases in response to the sensed temperature.

5. A method according to claim 1 wherein said vaporized working fluid is produced by first preheating said condensate with said exhaust gases.

6. A method according to claim 1 wherein the temperature of the hot exhaust gases is reduced before heat therein is transferred to said working fluid by forced injection of ambient air into said hot exhaust gases.

7. A method according to claim 1 wherein the step of condensing said expanded vaporized working fluid is carried out by cooling the expanded vaporized working fluid with air.

8. A gas turbine system with a heat recovery cycle comprising:
    a) a gas turbine unit for driving a utilization device and producing hot exhaust gases;
    b) a heat recovery heat exchanger containing a working fluid responsive to applied hot gases for producing vaporized working fluid and cooled gases which are vented;
    c) a vapor turbine connected to a generator and responsive to said vaporized working fluid for generating power and from which expanded working fluid exits;
    d) a condenser for condensing said expanded vaporized working fluid, and a pump for returning working fluid condensate to said heat recovery heat exchanger; and
    e) a combiner for combining ambient air with said hot exhaust gases and producing a mixture of hot exhaust gases and ambient air, said combiner being constructed and arranged to apply said mixture to said heat recovery heat exchanger; and f) a temperature sensor for sensing the temperature of said mixture and producing control signals, said combiner being responsive to said control signals for controlling the ratio of exhaust gases to ambient air in said mixture.

9. A gas turbine system according to claim 8 wherein said working fluid is water.

10. A gas turbine system according to claim 9 wherein said condenser includes an indirect contact heat exchanger containing an organic fluid responsive to said expanded vaporized working fluid for producing vaporized organic fluid, an organic vapor turbine responsive to said vaporized organic fluid for generating power and from which expanded vaporized organic fluid exits, an air-cooled condenser for condensing said expanded vaporized organic fluid into condensate, and means for returning the last mentioned condensate to said indirect contact heat exchanger.

11. A gas turbine system according to claim 8 wherein said working fluid is an organic fluid.

12. A gas turbine system according to claim 11 wherein said condenser is an air cooled organic vapor condenser.

13. A gas turbine system according to claim 1 including a positionable valve associated with said combiner for controlling the amount of ambient air mixed with said hot exhaust gases.

14. A gas turbine system according to claim 13 including a valve controller responsive to said control signals for controlling the position of said valve for controlling the amount of ambient air mixed with said hot exhaust gases.

15. A gas turbine system according to claim 1 wherein said heat recovery heat exchanger includes a vaporizer heat exchanger component and a preheater component arranged so that said vaporizer component encounters said hot applied gases before the latter encounter said preheater component.

16. A gas turbine system according to claim 15 wherein said heat recovery heat exchanger includes a tubular body having an inlet section into which said hot exhaust gases enter, and said control means includes an injector having a free end opening into said inlet section and through which ambient air is supplied, and fan means for drawing ambient air through said injector.

17. A gas turbine system according to claim 16 wherein said fan means is located upstream of said injector.

18. A gas turbine system according to claim 16 wherein said fan means is located downstream of said injector.

19. A gas turbine system according to claim 15 wherein said tubular body of said heat recovery heat exchanger includes an outlet section into which said cooled gases enter before being vented to the atmosphere.

20. A gas turbine system according to claim 15 wherein said working fluid is an organic fluid, and said heat recovery heat exchanger includes, in addition to said vaporizer heat exchange component and said preheater component, a vaporizer tank that receives heated organic liquid from said vaporizer heat exchange component, and preheated organic condensate from said preheater, and delivers vaporized organic fluid to said turbine, and liquid organic fluid to said vaporizer heat exchanger component.

21. A gas turbine system according to claim 1 including a connection for selectively switching said hot exhaust gases produced by said gas turbine unit between said heat recovery heat exchanger and a by-pass stack.

22. A gas turbine system according to claim 8 wherein said utilization device is a gas compressor for compressing gas and producing compressed gas.

23. A gas turbine system according to claim 22 wherein said gas compressor includes a cooler for cooling said compressed gas, said cooler being constructed and arranged to transfer heat from said compressed gas to said working fluid condensate before the latter is returned to said heat recovery heat exchanger.

24. A gas turbine system with organic fluid heat recovery cycle comprising:

a) a gas turbine unit for driving a utilization device and producing hot exhaust gases;

b) a heat recovery heat exchanger containing an organic fluid responsive to applied hot gases for producing vaporized organic fluid and cooled gases that are vented c) an organic vapor turbine responsive to said vaporized organic fluid for driving a generator and generating power and from which expanded organic vapor exits;

d) an air-cooled condenser for condensing said expanded vaporized organic fluid, and a pump for returning organic fluid condensate to said heat exchanger;

e) an adjustable connection for selectively switching said hot exhaust gases between said heat recovery heat exchanger and a by-pass stack; and f) control means to mix ambient air with said hot gases to form a mixture for controlling the temperature of said mixture; and g) means for applying said mixture to said heat recovery heat exchanger.

25. A gas turbine system with a heat recovery cycle comprising:

a) a gas turbine unit for driving a utilization device and producing hot exhaust gases;

b) a heat recovery heat exchanger containing a working fluid responsive to applied hot gases for producing vaporized working fluid and cooled gases which are vented;

c) a vapor turbine connected to a generator and responsive to said vaporized working fluid for generating power and from which expanded working fluid exits;

d) a condenser for condensing said expanded vaporized working fluid to condensate, and a pump for returning working fluid condensate to said heat recovery heat exchanger; and e) control means for controlling the temperature of said applied hot gases, said control means including mixing means for mixing ambient air with said hot exhaust gases and producing a mixture of hot exhaust gases and ambient air before the mixture is applied to the heat recovery heat exchanger and enters into heat exchange relationship with said working fluid, said mixing means being responsive to the temperature of said mixture for controlling the ratio of exhaust gases to ambient air in said mixture.

26. A gas turbine system with a heat recovery cycle comprising:

a) a gas turbine unit for driving a utilization device and producing hot exhaust gases;

b) heat recovery heat exchanger means containing working fluid responsive to applied hot gases for producing vaporized working fluid and cooled gases that are vented;

c) a vapor turbine responsive to said vaporized working fluid for driving a generator and generating power and from which expanded working fluid exits;

d) an air-cooled condenser for condensing said expanded working fluid to condensate, and a pump for returning said condensate to said heat recovery heat exchanger; and e) control means for controlling the temperature of said applied hot gases before the latter are applied to said heat exchanger means, including mixing means for mixing ambient air with said hot exhaust gases before the gas mixture of hot exhaust gases and ambient air is applied to the heat recovery heat exchanger and enters into heat exchange relationship with said water.

27. A gas turbine system according to claim 26 including a connection for selectively switching said hot exhaust gases from said gas turbine unit between said heat exchanger and a by-pass stack.

* * * * *